United States Patent [19]

Bell

[11] Patent Number: 5,723,970

[45] Date of Patent: Mar. 3, 1998

[54] BATTERY CHARGING CIRCUITRY HAVING SUPPLY CURRENT REGULATION

[75] Inventor: David B. Bell, Los Altos, Calif.

[73] Assignee: Linear Technology Corporation, Milpitas, Calif.

[21] Appl. No.: 628,802

[22] Filed: Apr. 5, 1996

[51] Int. Cl.⁶ ............................................ H01M 10/46
[52] U.S. Cl. ............................................ 320/30; 320/39
[58] Field of Search .................... 320/5, 12, 14, 320/30, 31, 39, 40, 49, 54, 56; 307/66

[56] References Cited

U.S. PATENT DOCUMENTS

| | | | |
|---|---|---|---|
| 4,384,214 | 5/1983 | Crick et al. | 307/66 |
| 4,843,299 | 6/1989 | Hutchings | 320/39 X |
| 4,885,523 | 12/1989 | Koenck | 320/40 X |
| 5,150,032 | 9/1992 | Ho | 320/14 |
| 5,382,893 | 1/1995 | Dehnel | 320/32 |
| 5,418,445 | 5/1995 | Alpert et al. | 320/14 |
| 5,561,361 | 10/1996 | Sengupta et al. | 320/14 |

*Primary Examiner*—Edward Tso
*Attorney, Agent, or Firm*—Fish & Neave; Michael J. DeHaemer

[57] ABSTRACT

A power supply is disclosed for use in battery powered electronic devices. The power supply includes a power source which supplies power to the electronic device itself as well as to battery charging circuitry integral to the power supply. The battery charging circuitry monitors an output current, or other parameter, of the power source output. Feedback circuitry regulates the output of the battery charging circuitry so that output current, or other parameter of the power source output, is kept within predetermined limits.

20 Claims, 4 Drawing Sheets

BATTERY CHARGING CIRCUITRY HAVING SUPPLY CURRENT REGULATION

BACKGROUND OF THE INVENTION

The present invention relates to methods and circuitry for power supplies for use in portable electronic devices. More specifically, the present invention relates to battery charging circuitry, wherein the charging rate of the battery is regulated to limit a current drawn from a power source.

BACKGROUND

The increasing mobility of society has created a large market for portable, battery powered, electronic devices, such as notebook computers, video camcorders, and cellular telephones. Advances in integrated circuit technologies continually shrink the size and power requirements of electronic devices, making battery power a practical alternative to "corded" operation.

In general, batteries are safe, compact, portable, and convenient, making them ideal for use in portable electronic devices. In the past, one drawback to battery powered operation of electronic devices was the cost and inconvenience of the frequent need to replace discharged batteries. Rechargeable batteries have largely overcome the economic drawback of frequent battery replacement, but still may require frequent recharging.

Some portable electronic devices have battery charging circuitry which is integral to the device's power supply so that the battery may be recharged without removing the battery from the device. For example, many notebook computers contain circuitry for charging their battery packs whenever the notebook is connected to an external power source, such as a "wall wart" type AC/DC power converter. Such power converters are typically designed to supply a regulated voltage output up to a maximum rated power or current.

An AC/DC power converter for a product having integral charging circuitry could be designed to handle the power requirements of all the circuitry of the portable electronic device, plus the power required to recharge the device's battery. For example, a previously known AC/DC power converter for a notebook computer may be designed to deliver a maximum of 50 Watts of power: 20 Watts of power to run the notebook computer itself, and 30 Watts of power to recharge the notebook's battery.

However, designing an AC/DC power converter for a worst-case power loading may be undesirable due to the increased size, weight, and expense. Also, as shown in FIG. 2A, much of the power capacity of the power converter may be wasted. For example, using the notebook computer described above, 30 Watts of the 50 Watt power supply, i.e., sixty percent of its capacity, may go unused, except during a battery charging operation.

Alternatively, battery charging circuitry may be designed to operate at any of a number of discrete power levels based on a control signal from other circuitry in the portable device. This lets an AC/DC power converter be designed to have a power capacity only slightly larger than the power requirements of the portable electronic device. For example, a 30 Watt power converter may be designed for a notebook computer requiring 20 Watts of power. As shown in FIG. 2B, when the notebook computer is idle, the processor may provide a control signal to the battery charging circuitry letting it use the full 30 Watts of power for battery charging. Conversely, when the notebook computer is being used, the processor may provide a control signal that causes the battery charging circuitry to restrict the available battery charging power to less than about 10 Watts. While controlling battery charging power at discrete levels reduces power waste, some power capacity of the AC/DC power converter may still go unused.

Portable electronic devices employ a vast array of power saving techniques to reduce their average power consumption. For example, a notebook computer may turn off its disk drives and display, or may reduce the clock frequency of the main processor during periods of inactivity. Such power saving features may reduce the average power usage of the portable device to a small fraction of its peak power usage. As shown in FIG. 2B, unless the battery charging circuitry can be operated at many different power levels, some power may still be unavailable for battery charging operations, and therefore be effectively wasted.

Power that is unavailable or otherwise wasted results in the use of larger AC/DC power converters, or in increased battery charge times, than may otherwise be required for a particular application. For example, in an application requiring the capability of completely recharging a battery in two hours, a larger AC/DC power converter would be required if some power is wasted, than if all available excess power could be used for battery charging. Since the size and weight of an AC/DC power converter is generally dictated by its power capacity, a more powerful supply is typically bigger, heavier, and more expensive than a power converter having a lower power rating.

It would therefore be advantageous to provide methods and circuitry so that the full capacity of an input power converter may be efficiently utilized, thereby enabling the use of smaller, lighter, and less costly power converters, while maintaining optimum battery charging capabilities.

It would also be advantageous to recharge a device's battery at a higher rate when the device's power loading is relatively low, and to recharge the battery at a low rate when the device's power loading is relatively high.

Furthermore, because the power demand of a portable electronic device, such as a notebook computer, may vary during the course of a battery charge, it would be advantageous to vary the charging rate of the battery during a charge to best utilize a power converter's capacity without exceeding a rating of the power supply.

SUMMARY OF THE INVENTION

In view of the foregoing, it is therefore an object of the invention to provide methods and circuitry whereby a smaller, lighter, and less costly external power converter may be used with battery powered, electronic devices.

It is also an object of the invention to provide methods and circuitry to recharge a device's battery at a higher rate when the device's power loading is relatively low, and to recharge a battery at a lower rate when the device's power loading is relatively high.

It is a further object of the invention to provide circuitry and methods to continuously vary the power used for battery charging to maximize utilization of the power handling capacity of an external power converter.

It is an additional object of the invention to vary the charging rate of a battery to prevent the total power drawn from a power converter from exceeding a rating of the power converter.

It is an additional object of the present invention to provide battery charging circuitry which is not specific to any one battery construction or cell chemistry.

These and other objects of the invention are provided by battery charging circuitry that includes a feedback control loop which controls the charging rate to limit the current drawn from the power converter.

BRIEF DESCRIPTION OF THE DRAWINGS

The above and other objects and advantages of the present invention will be apparent upon consideration of the following detailed description, taken in conjunction with the accompanying drawings, in which like reference characters refer to like parts throughout, and in which.

DETAILED DESCRIPTION

Figure 1:
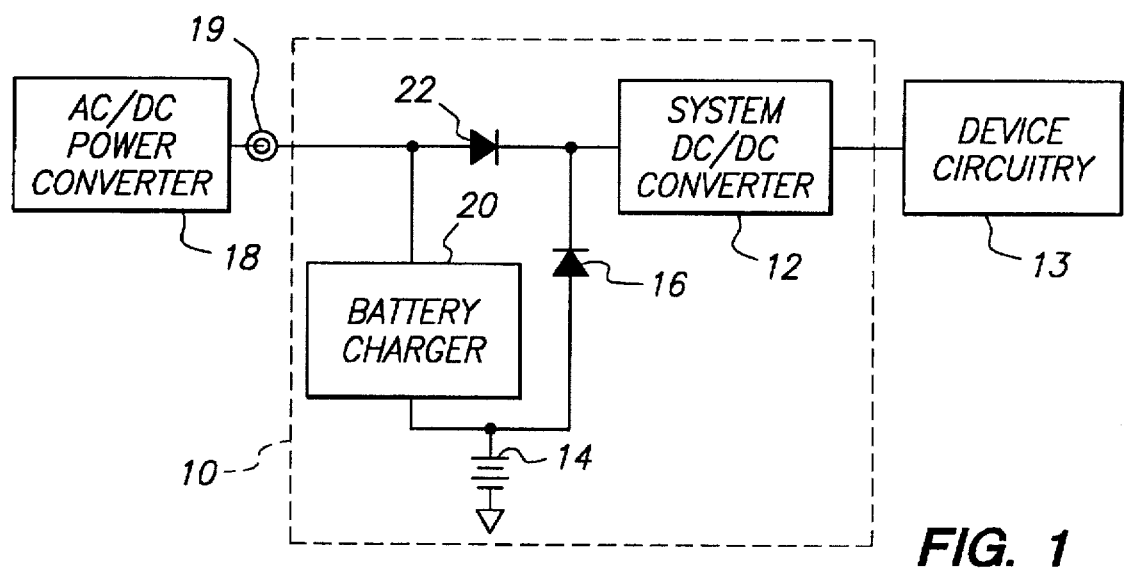
FIG. 1 is a simplified block diagram of power supply circuitry for a typical portable electronic device.

FIG. 1 is a simplified block diagram of typical power supply circuitry 10 for a portable electronic device. System DC/DC converter 12 provides regulated DC power to device circuitry 13, which is the functional circuitry of the portable electronic device. For example, in a cellular telephone, device circuitry 13 may include a digital signal processor, radio transceiver, memory, and various support circuitry. During portable operation, device circuitry 13 is powered from battery 14. When battery 14 becomes depleted, it may be recharged from AC/DC power converter 18 via battery charger 20.

Power for recharging battery 14 is provided by input power converter 18, which may convert AC power from an electrical outlet into a form suitable for use by battery charger 20 and DC/DC converter 12. Alternatively, input power converter 18 may be a DC/DC converter which converts power from a DC source, such as from a car cigarette lighter socket. As used with notebook computers, AC/DC power converter 18 is typically separate from, but may be built into, the notebook computer. For example, power converter 18 may be a "brick" or "wall-wart" type AC/DC power converter, accepting mains AC power and providing 24 volt DC power for a notebook computer.

When in use, power converter 18 provides power to both DC/DC converter 12, and to battery charger 20. Diodes 22 and 16 act as switches to prevent power from flowing in inappropriate directions through power supply circuitry 10. Specifically, diode 22 prevents the circuitry of power converter 18 and battery charger 20 from loading down battery 14 when power converter 18 is off or disconnected, while diode 16 prevents unregulated charging of battery 14 when power converter 18 is providing power to DC/DC converter 12. In many applications, diodes 16 and 22 are implemented as logic controlled MOSFET switches, to minimize voltage drop and power loss between power converter 18 or battery 14 and DC/DC converter 12.

Typically, power converter 18 is rated by its output voltage and maximum current capability. For example, power converter 18 may be rated for an output of 24 volts DC at maximum current of 1.5 amps. Drawing a current above the rated maximum current may result in damage to or reduced reliability of power converter 18. It is therefore necessary to ensure that the total power consumption of the portable electronic device, i.e., the sum of the power drawn by DC/DC converter 12 and battery charger 20, does not exceed the output current rating of power converter 18.

To ensure its ratings are not exceeded, input power converter 18 typically is designed with a power capacity that exceeds the maximum power demand of DC/DC converter 12 and device circuitry 13. For example, in a notebook computer the worst-case current demand may occur when the notebook's display is energized, its hard disk is spinning, and its CPU is operating at maximum clock speed. As described above, battery charging circuitry 20 may be limited to a low battery charging rate when device circuitry 13 is active to ensure a power rating of power converter 18 is not exceeded.

Figure 2A:
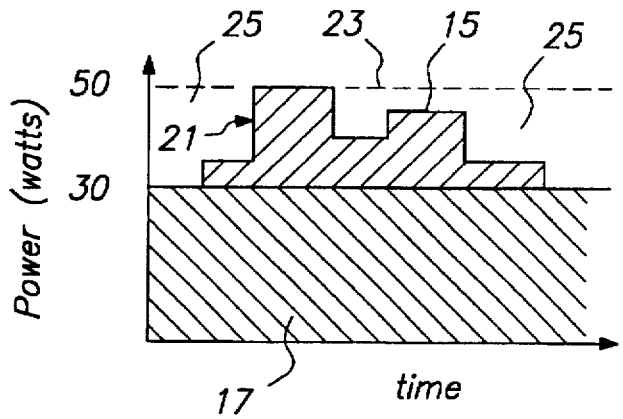
FIG. 2A is a graph showing exemplary power usage in a portable computer in which the external power converter is sized to handle the notebook's peak power.
Figure 2B:
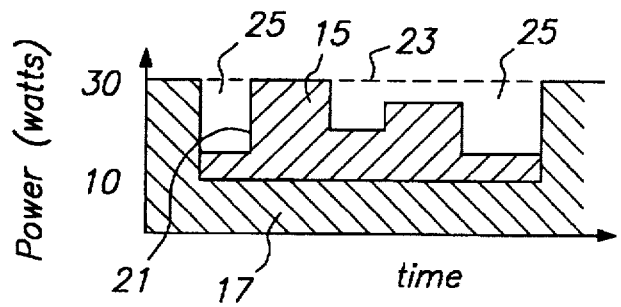
FIGS. 2B and 2C are graphs showing exemplary power usage in a portable computer in which the power drawn by the battery charging circuitry is limited to one of several discrete levels and to a continuum of levels respectively.

FIGS. 2A and 2B represent two alternative previously known ways to design power supply 10 and AC/DC converter 18. In FIG. 2A, region 17 represents the power input to battery charger 20 while charging battery 14. Region 15 represents the power requirements of device circuitry 13, which may vary over time. For example, power increase 21 may represent an increase in power due to a portable computer spinning up its hard disk drive, or powering up a display. By designing AC/DC converter 18 such that its power handling limit 23 is set high enough to accommodate the maximum load due to battery charging plus the load required by device circuitry 13, the power handling limit will never be violated. However, as shown by region 25 of FIG. 2A, much of the capacity of AC/DC converter 18 goes unused.

Alternatively, battery charger 20 may be designed so that it can operate in one of two different states, as shown in FIG. 2B. In accordance with this prior art design, battery charger 20 may charge battery 14 at a high rate or low rate depending on whether or not any of device circuitry 13 is active. For example, if device circuitry 13 is off, or in a sleep (i.e. reduced power) state, battery charger 20 may use as much power from AC/DC converter 18 as it needs. However, when device circuitry 13 is active (region 15), battery charger 20 is restricted to using a smaller predetermined level of power. For example, when device circuitry 13 is active, battery charger 20 may be limited to providing only a trickle charge to battery 14. Typically, battery charger 20 limits battery charging power in response to a control signal from device circuitry 13. While this design permits AC/DC converter 18 to be designed with a lower power rating than the rating of the converter of FIG. 2A, some wasted power handling capacity remains (region 25).

Over-designing power converter 18 ensures its ratings will not be exceeded; however, it also ensures that its power handling capacity will be under-utilized much of the time. It would therefore be advantageous to provide a means of actively limiting the power drawn by battery charger 20 to whatever remaining power capacity is not currently being used by device circuitry 13.

Figure 2C:
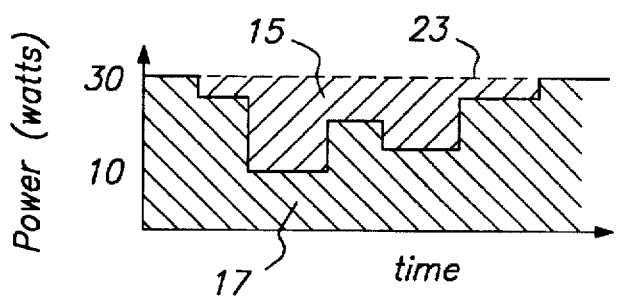

For example, in FIG. 2C, the power used by device circuitry 13 (region 15) is effectively subtracted from the power capacity of AC/DC power converter 18. The area below power limit 23 and also below region 15 is available for use by battery charging circuitry 20. Since battery charger 20 may use any or all of the excess power, the power handling capacity of AC/DC converter 18 may be used more effectively, and AC/DC converter 18 may therefore be smaller, lighter, and less costly than known prior art designs.

The power sharing arrangement illustrated in FIG. 2C represents actively limiting the power demand of battery charger 20 to ensure power limit 23 of AC/DC converter 18 is not exceeded. Active power limiting is accomplished by monitoring the power output of AC/DC converter 18 and controlling the power demand of battery charging circuitry 20 to keep the output power within safe limits. In general, input power converter 18 has a fixed output voltage, so monitoring and limiting its output current also limits the output power of power converter 18.

Figure 3:
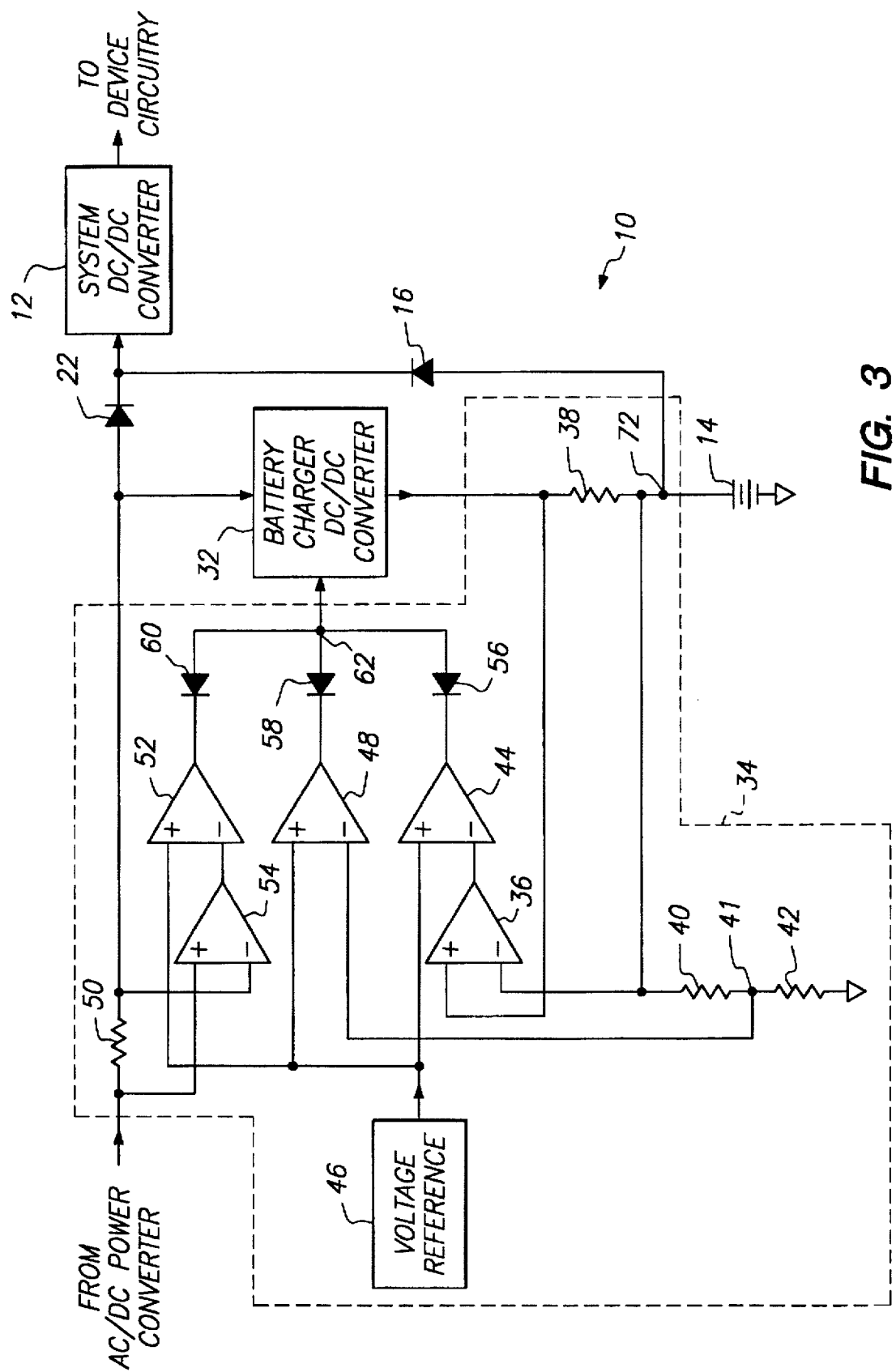
FIG. 3 is a schematic block diagram of an illustrative embodiment of power supply circuitry, including battery charging circuitry, for a portable computer in accordance with the present invention.

In conjunction with FIG. 3, illustrative power supply circuitry 10 of FIG. 1 is described as an embodiment of a power supply for a notebook computer. However, the present invention is not limited to such an application, and one skilled in the art will readily recognize many additional applications of the principles of the present invention.

Notebook computer power supply 10 includes DC/DC converter 12 for converting an input voltage to the various regulated voltages as required by the design of the portable computer. For example, DC/DC converter 12 may receive 24 volts from power converter 18 of FIG. 1 and provide 2.9 V, 3.0 V, 3.3 V, 5.0 V, or 12.0 V DC power to various portions of the notebook computer, such as integrated circuits and disk drives. Input power for DC/DC converter 12 may be supplied from either power converter 18 or battery 14 depending on the availability of an external power source for power converter 18. When a source of electrical power is available, such as from an electrical outlet in a home or office, power converter 18 accepts AC power from the electrical outlet and provides DC power to converter 12.

When a convenient source of external power is unavailable, rechargeable battery 14 may provide temporary power to DC/DC converter 12 via blocking diode 16. The length of time a portable electronic device can be operated away from an external power source is limited by the capacity of battery 14. Eventually, battery 14 may become discharged to the point that it can no longer provide enough power to DC/DC converter 12, and will have to be recharged.

As is common in portable computer power supplies, power supply circuitry 10 includes battery charging circuitry including DC/DC converter 32 and control circuitry 34. DC/DC converter 32 provides power for recharging battery 14.

Control circuitry 34 includes feedback loops for monitoring both the charging voltage and charging current, and controls them in accordance with a battery charging profile dependant on the specific chemistry and design of battery 14, as well as its state of discharge.

Still referring to FIG. 3, current sense resistor 38, current sense amplifier 36, and error amplifier 44, comprise a feedback loop for controlling the charging current of battery 14. Current sense amplifier 36 provides an output proportional to the voltage across current sense resistor 38, and thus representative of the current through resistor 38. Error amplifier 44 generates a control signal proportional to the difference (i.e., error) between the output of current sense amplifier 36 and a reference level provided by voltage reference 46. Based on the control signal, the output of DC/DC converter 32 is adjusted to control the charging current of battery 14.

For example, if the charging current is too low, the voltage across resistor 38 will also be low, the output of current sense amplifier 36 will be lower with respect to the reference level and the control signal from error amplifier 44 will cause DC/DC converter 32 to output a higher current.

Similarly, resistors 40 and 42, in conjunction with error amplifier 48 comprise a feedback loop for monitoring and controlling the battery charging voltage. The charging voltage feedback loop operates to maintain the voltage at node 41 equal to the value of the voltage from voltage reference 46. Resistors 40 and 42 form a voltage divider for scaling the voltage of battery 14 to a value near the value of reference voltage 46. Error amplifier 48 provides a control signal to DC/DC converter 32 which is dependant on the difference between the scaled battery voltage at node 41 and the reference voltage. The control signal is provided to DC/DC converter 32 to maintain the desired battery charging voltage.

According to the principles of the present invention, a third feedback loop is provided that monitors the current being drawn from input power converter 18. Current sense amplifier 54 provides a signal proportional to the current through current sense resistor 50. Error amplifier 52 provides a control signal to DC/DC converter 32 proportional to the difference between the outputs of current sense amplifier 54 and voltage reference 46. Thus, when the current through resistor 50 is too high, the output of current sense amplifier 54 will be high relative to the reference level. Error amplifier 52 will in turn generate a control signal causing DC/DC converter 32 to lower the charging current, thereby lowering the current drawn from power converter 18. Diodes 56, 58, and 60 prevent the control signals provided by error amplifiers 44, 48, and 52 from interfering with one another, so that whichever error amplifier has the lowest output controls the operation of battery charger DC/DC converter 32.

The third feedback loop adjusts the output voltage and current of battery charger DC/DC converter 32 to limit the total current through current sensing resistor 50. For example, when the notebook's display is turned off by the computer's power management system, less power is drawn by system DC/DC converter 12, and therefore more power is available for battery charger DC/DC converter 32. However, when the notebook re-energizes its display system, because the user presses a key on the notebook's keyboard, for example, the power drawn by system DC/DC converter 12 increases, causing the current through current sense resistor 50 to momentarily exceed the current limit of AC/DC converter 18. The input current feedback loop then causes battery charger DC/DC converter 32 to reduce the battery charging current, thereby reducing the power demand of DC/DC converter 32, and bringing current supplied by power converter 18 within limits.

Figure 4A:
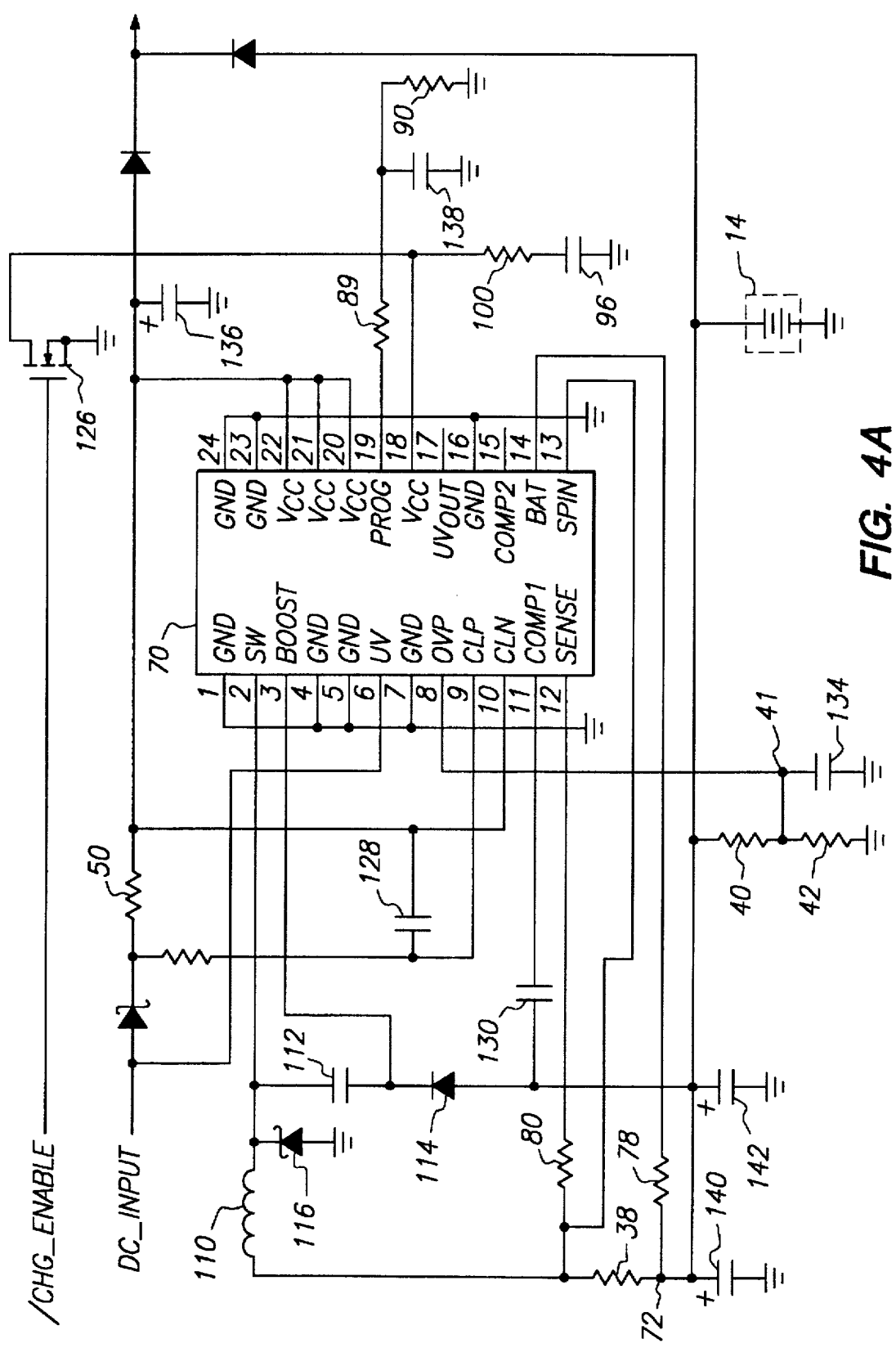
FIGS. 4A and 4B are, respectively, an illustrative schematic diagram of a battery charger designed in accordance with the principles of the present invention, and a block diagram of an illustrative integrated circuit used therein.
Figure 4B:
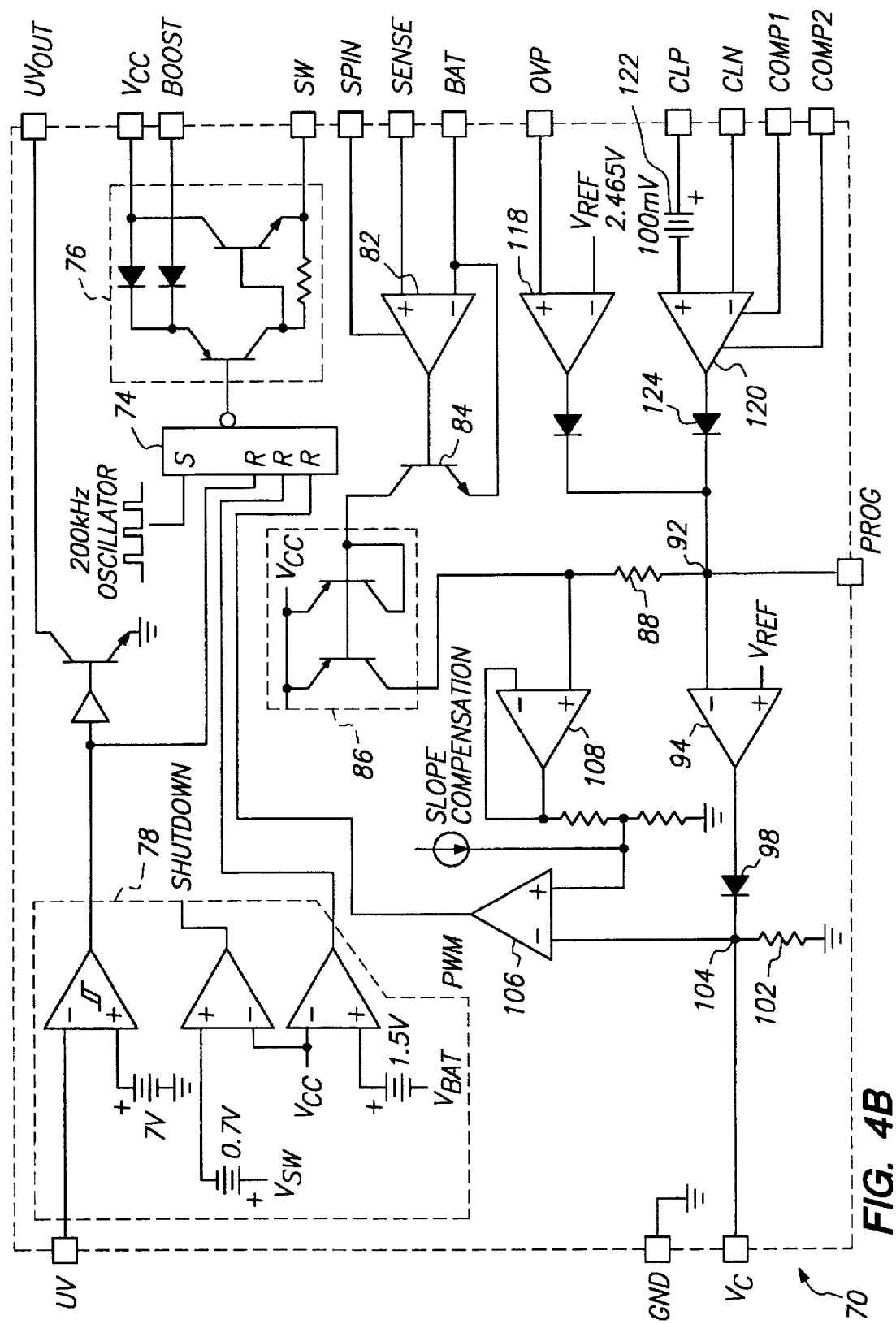

Referring now to FIG. 4A a schematic of an illustrative battery charging circuitry 20, including integrated circuit 70, which is illustrated in more detail in FIG. 4B, is described. Integrated circuit 70 includes a conventional current-mode switching DC/DC converter, including flip-flop 74, switch circuitry 76, and shutdown and protection circuitry 78. Switch circuitry 76, in conjunction with inductor 110, capacitor 112, diode 114, Schottky rectifier 116, and capacitors 140 and 142, forms a "Buck" step-down DC/DC power converter. The converter accepts DC power at DC_INPUT, which is connected to $V_{cc}$ of IC 70 (pins 20, 21, and 22), and provides regulated DC power at node 72.

During a battery charge, the voltage at node 72 is regulated so that current flows through current sense resistor 38 to battery 14. The voltage drop across current sense resistor 38 is monitored by IC 70 via its SENSE and BAT terminals (pins 12 and 14 respectively). Resistors 78 and 80 compensate for biasing current flowing into the SENSE and BAT terminals of IC 70 and form part of the current regulation loop.

Referring now to FIG. 4B, the SENSE and BAT terminals of IC 70 are connected to current sense amplifier 82. Transistor 84 and current sense amplifier 82 form a voltage-to-current amplifier, wherein the collector current flowing through transistor 84 is a function of the differential voltage across current-sense resistor 38, which in turn is a function of the charging current flowing through current sense resistor 38 (FIG. 4A). The collector current of transistor 84 is therefore indicative of the battery charging current.

Current mirror 86 causes a current equal to the collector current of transistor 84 to flow through internal resistor 88. Assuming that the outputs of amplifiers 118 and 120 are low (i.e. integrated circuit 70 is regulating charging current), then all of the current flowing through resistor 88 must flow out of PROG pin 19 and through programming resistors 89 and 90 (FIG. 4A). This develops a voltage on the inverting input of error amplifier 94 that is proportional to the battery charging current.

When the voltage at the inverting input of amplifier 94 is below the voltage at its non-inverting input, i.e., when the voltage at node 92 is below the reference voltage, the output of error amplifier 94 is driven high. Conversely when the voltage at node 92 is above the reference voltage, the output of error amplifier 94 is driven low.

The output of error amplifier 94 represents a control voltage analogous to the signal at node 62 of FIG. 3. A saw-tooth wave form applied to the non-inverting input of comparator 106, is compared to the voltage at node 104 to create a pulse width modulated (PWM) signal at the output of amplifier 106. The PWM signal is coupled to flip-flop 74 to control the operation of switch circuitry 76 to regulate the output voltage of the DC/DC converter, i.e. the voltage at node 72.

As an example, consider the case in which the charging current is lower than the desired level. The lower than desired current will be sensed by amplifier 82 as a voltage across resistor 38. Transistor 84 and current mirror 86 will then cause a relatively low current to flow through internal resistor 88 and external programming resistors 89 and 90. Because the current through the resistors is relatively low, the voltage at interior node 92 may be less than the reference voltage at the non-inverting input of amplifier 94.

Because the voltage at node 92 is less than the reference voltage, the output of error amplifier 94 will begin to go high, raising the voltage at node 104, thus causing the voltage on the non-inverting input of comparator 106 to rise. This delays the reset pulse from comparator 106 relative to the 200 kHz oscillator, increasing the "on" duty cycle factor. The increased "on" duty cycle factor causes an increase in the output voltage of DC/DC converter 32, thereby increasing the current flow through current sensing resistor 38. In a similar manner, too high a charging current causes the voltage at node 92 to exceed the reference voltage, reducing the output voltage of error amplifier 94, reducing the current through sense resistor 38.

From the foregoing description, it is apparent that the circuitry of FIGS. 4A and 4B controls the output of DC/DC converter 32 (i.e. at node 72) to maintain the voltage at node 92 at approximately the same voltage as the reference voltage. The voltage at node 92 is a function of the current flowing from current mirror 86 multiplied by the sum of external programming resistors 89 and 90. By using various values for the programming resistors, a target charging current can be programmed into the battery charging circuitry.

Also affecting the voltage at internal node 92 are the outputs of feedback amplifiers 118 and 120. Feedback amplifier 118 provides additional current flow to node 92 responsive to the relationship between a reference voltage at its non-inverting input and the voltage at the overvoltage terminal (OVP) of IC 70 (pin 8). External resistors 40 and 42 form a voltage divider for scaling the maximum desired voltage of battery 14 to a value approximately equal to that of the reference voltage.

For example, if the voltage at the OVP terminal, as scaled by resistors 40 and 42, exceeds the reference voltage, then error amplifier 118 supplies additional current to node 92, tending to increase the voltage at node 92, thus lowering the threshold voltage at node 104. A lower threshold voltage decreases the delay of the PWM reset signal output by comparator 106, causing a decrease in the duty factor of switching circuitry 76. As a result, the voltage at node 72 will decrease, and consequently, so will the voltage at OVP. Amplifier 118, and its associated circuitry, therefore serves to limit the voltage applied to battery 14 to a voltage determined by the values of resistors 40 and 42.

In accordance with the principles of the present invention a third feedback loop, including current sense resistor 50 and amplifier 120, is provided for regulating DC/DC converter 32 based on the output of AC/DC power converter 18. Amplifier 120 supplies additional current to node 92 based on the output current of power converter 18. The output current is sensed by amplifier 120 as a voltage drop across current sensing resistor 50. If the voltage drop exceeds the 100 mV offset provided by constant voltage source 122, then amplifier 120 will supply additional current to node 92 through diode 124. The voltage at node 92 will therefore increase, causing it to exceed the reference voltage at the non-inverting input of amplifier 94. As discussed in the preceding paragraph, raising the voltage at node 92 decreases the conduction duty factor, thereby reducing the power drawn by DC/DC converter 32. The third feedback loop thus regulates switch circuitry 76 to limit the maximum current drawn from power converter 18. To accommodate different power converters, the value of resistor 50 may be selected so that at the desired limiting current the voltage drop across resistor 50 will be approximately 100 mV.

Overall, battery charging circuitry 20 of FIGS. 4A and 4B operates to provide a regulated voltage at the output of DC/DC converter 32 (i.e., at node 72). Voltage regulation is accomplished by controlling the conduction duty factor of switch circuitry 76. The conduction duty factor is determined by the voltage at node 104 as determined by amplifier 94 and the voltage at node 92. The voltage at node 92 is, in turn, a function of (1) charging current as determined by amplifier 82, (2) battery voltage as determined by amplifier 118, and (3) power converter output current as determined by amplifier 120.

Additional circuit components shown in FIGS. 4A and 4B provide various ancillary and compensatory functions. For example, transistor 126 provides a means of enabling and disabling charging circuitry 20. A high signal at CHG_ENABLE turns on transistor 126, effectively grounding the $V_c$ terminal of IC 70. With the $V_c$ terminal grounded, the voltage at node 104 will never exceed the voltage threshold set by amplifier 108, so switch circuitry 76 will remain off. Also connected to the $V_c$ terminal, capacitor 96 and resistor 100 form a compensation network for stabilizing the feedback loop to prevent control loop oscillation. Also included in FIG. 4A are capacitors 128, 134, 136, and 138 which provide additional frequency compensation and filtering functions.

The preceding detailed description of a preferred embodiment of the invention has been presented in terms of battery charging circuitry for use in a portable notebook computer. However, the invention is not limited to such an application. One skilled in the art will recognize that various modifications and enhancements may be made to the disclosed circuitry without departing from the spirit of the invention. For example, programming resistors 89 and 90, and voltage scaling resistors 40 and 42 may be replaced or combined with a digital-to-analog converter, to allow a host microprocessor to program the current and voltage characteristics dependant on the design of battery 14. As another example, current sensing resistor(s) 38 and/or 50 may be placed in the return leg (i.e. ground leg) of the circuit instead of in the supply leg.

One skilled in the art will therefore appreciate that the present invention can be practiced by other than the described embodiments, which are presented for purposes of illustration and not of limitation, and the present invention is limited only by the claims which follow:

What is claimed is:

1. Circuitry for recharging a battery from a power source, wherein said power source provides power characterized by a plurality of parameters, at least one of said plurality of parameters having a predetermined limit, the circuitry comprising:
    an input for receiving power from the power source;
    an output for delivering power to the battery;
    sensing circuitry foe monitoring the at least one parameters; and
    regulating circuitry, coupled to the input, the output, and the sensing circuitry, for regulating the voltage or current at the output of the battery charging circuitry responsive to the monitored parameter.

2. The circuitry of claim 1 wherein the regulating circuitry regulates the output to provide battery charging voltage and current according to predetermined battery charging voltage and current profiles.

3. The circuitry of claim 1 wherein the regulating circuitry comprises circuitry for regulating the voltage and the current at the output.

4. The circuitry of claim 1 wherein the at least one parameter is the output current of the power source.

5. The circuitry of claim 4 wherein the predetermined limit is a maximum current rating of the power source.

6. The circuitry of claim 1 wherein the regulating circuitry comprises circuitry for regulating the output responsive to the at least one parameter to keep the at least one parameter from substantially violating the predetermined limit.

7. The circuitry of claim 6 wherein the at least one parameter is the output current of the power source and the predetermined limit is a maximum current rating of the power source.

8. A method of recharging a battery from a power source providing power characterized by a plurality of parameters, at least one of said plurality of parameters having a predetermined limit, the method comprising:
    providing battery charging circuitry having an input for receiving power from the power source, and an output for coupling to a battery;
    monitoring the at least one parameter; and
    regulating the battery charging circuitry so that the monitored parameter does not substantially violate the predetermined limit.

9. The method of claim 8 wherein the step of regulating the battery charging circuitry comprises regulating an output voltage and current of the battery charging circuitry to provide battery charging voltages and currents according to predetermined voltage and current profiles.

10. The method of claim 8 wherein the step of regulating the battery charging circuitry comprises regulating either a voltage or a current at the output of the battery charging circuitry.

11. The method of claim 10 wherein the battery charging circuitry is regulated responsive to the at least one parameter to keep a value of the at least one parameter from substantially violating the predetermined limit.

12. The method of claim 8 wherein the at least one parameter is the output current of the power source and the predetermined limit is a maximum current rating of the power source.

13. Circuitry for recharging a battery from a source of power characterized by a plurality of parameters, wherein at least one of said plurality of parameters has a predetermined limit, the circuitry comprising:
    input means for receiving power from the power source;
    output means for delivering power to a battery;
    sensing means for monitoring the at least one parameter; and
    regulating means, coupled to the input, the output, and the sensing circuitry, for regulating the battery charging circuitry responsive to the monitored parameter.

14. The circuitry of claim 13 wherein the regulating means comprises means for regulating either a voltage or a current at the output means.

15. The circuitry of claim 13 wherein the regulating means regulates a voltage and a current at the output means according to predetermined battery charging voltage and current profiles.

16. The circuitry of claim 13 wherein the at least one parameter is the output current of the power source and the predetermined limit is a maximum current rating of the power source, and wherein the regulating circuitry regulates a voltage and a current at the output means to keep the output current of the power source from substantially violating the maximum current rating of the power source.

17. Circuitry for recharging a battery from a power source having an output characterized by a plurality of parameters, the circuitry comprising:
    a power converter, having an input coupled to an output of the power source, and an output adapted to be coupled to the battery, the power converter converting power provided by the power source to a form suitable for recharging the battery;
    first feedback circuitry, coupled to the power converter, for controlling the power converter responsive to a voltage at the output of the power converter;
    second feedback circuitry, coupled to the power converter, for controlling the power converter responsive to a current at the output of the power converter; and
    third feedback circuitry, coupled to the power source and to the power converter, for controlling the power converter responsive to a predetermined one of the plurality of parameters.

18. The circuitry of claim 17 wherein the predetermined one of the plurality of parameters comprises a current at the output of the power source.

19. The circuitry of claim 18 wherein the third feedback circuitry controls the power converter to keep the output current of the power source from exceeding a predetermined value.

20. Power supply circuitry for a portable electronic device, comprising:
    a first node adapted to be coupled to a source of power external to the portable electronic device;

a second node adapted to be coupled to a battery;

a third node, coupled to the first and second nodes, and to circuitry of the portable electronic device; and battery charging circuitry, comprising:

feedback circuitry coupled to the first node for providing a control signal responsive to an output parameter of the power source; and regulating circuitry, coupled to the first node, the second node, and the feedback circuitry, for providing power to the battery, wherein the power provided to the battery is regulated responsive to the control signal.

* * * * *